United States Patent
Matsen et al.

(10) Patent No.: US 11,541,575 B2
(45) Date of Patent: Jan. 3, 2023

(54) INDUCTION FORMING AND CURING OF THERMOSET COMPOSITE CHARGES

(71) Applicant: The Boeing Company, Chicago, IL (US)

(72) Inventors: Marc R. Matsen, Seattle, WA (US); Timothy J. Luchini, St. Louis, MO (US); Bret A. Voss, Seattle, WA (US); Christopher J. Hottes, Seattle, WA (US)

(73) Assignee: The Boeing Company, Chicago, IL (US)

( * ) Notice: Subject to any disclaimer, the term of this patent is extended or adjusted under 35 U.S.C. 154(b) by 117 days.

(21) Appl. No.: 17/026,066

(22) Filed: Sep. 18, 2020

(65) Prior Publication Data
US 2021/0001515 A1 Jan. 7, 2021

Related U.S. Application Data

(62) Division of application No. 15/713,424, filed on Sep. 22, 2017, now Pat. No. 10,814,526.

(51) Int. Cl.
*B29C 33/06* (2006.01)
*B29C 35/08* (2006.01)
(Continued)

(52) U.S. Cl.
CPC .......... *B29C 33/06* (2013.01); *B29C 35/0805* (2013.01); *B29C 70/44* (2013.01);
(Continued)

(58) Field of Classification Search
CPC ..... B29C 33/06; B29C 35/0805; B29C 70/44; B29C 2035/0811; B29C 2035/0816; B30B 5/02; B29K 2101/10
(Continued)

(56) References Cited

U.S. PATENT DOCUMENTS

| 5,407,610 | A | | 4/1995 | Kohama et al. |
| 5,808,281 | A | * | 9/1998 | Matsen ................. B29C 70/506 |
| | | | | 219/645 |

(Continued)

FOREIGN PATENT DOCUMENTS

| CN | 102205575 A | 10/2011 |
| CN | 103963317 A | 8/2014 |
| CN | 104827682 A | 8/2015 |

OTHER PUBLICATIONS

European Patent Office Communication and Extended Search Report, dated Feb. 5, 2019, regarding Application No. 18179721.8, 5 pages.

(Continued)

*Primary Examiner* — Matthew J Daniels
*Assistant Examiner* — Gregory C. Grosso
(74) *Attorney, Agent, or Firm* — Yee & Associates, P.C.

(57) ABSTRACT

A first tooling die and a second tooling die are movable with respect to each other. The first tooling die and the second tooling die form a die cavity. The first tooling die and the second tooling die comprise a plurality of stacked metal sheets. A plurality of air gaps is defined between adjacent stacked metal sheets. A first smart susceptor material is within the die cavity and connected to the first tooling die. The first smart susceptor material has a first Curie temperature. A second smart susceptor material is within the die cavity and associated with the second tooling die. The second smart susceptor material has a second Curie temperature lower than the first Curie temperature. A flexible membrane is between the second tooling die and the first smart susceptor material. The flexible membrane is configured to receive pressure.

21 Claims, 8 Drawing Sheets

(51) Int. Cl.
  *B29C 70/44* (2006.01)
  *B30B 5/02* (2006.01)
  *B29K 101/10* (2006.01)

(52) U.S. Cl.
  CPC ........ *B30B 5/02* (2013.01); *B29C 2035/0811* (2013.01); *B29C 2035/0816* (2013.01); *B29K 2101/10* (2013.01)

(58) Field of Classification Search
  USPC .......................................................... 264/403
  See application file for complete search history.

(56) References Cited

U.S. PATENT DOCUMENTS

| | | | |
|---|---|---|---|
| 6,180,932 B1 | 1/2001 | Matsen et al. | |
| 8,017,059 B2 | 9/2011 | Matsen et al. | |
| 8,330,086 B2* | 12/2012 | Miller | B29C 73/30 |
| | | | 219/602 |
| 8,343,402 B1* | 1/2013 | Matsen | B29C 35/16 |
| | | | 264/109 |
| 8,372,327 B2 | 2/2013 | Matsen et al. | |
| 8,410,409 B1 | 4/2013 | Matsen et al. | |
| 8,480,823 B1 | 7/2013 | Matsen et al. | |
| 8,556,619 B2 | 10/2013 | Matsen et al. | |
| 9,174,398 B2 | 11/2015 | Miller et al. | |
| 9,314,975 B1 | 4/2016 | Matsen et al. | |
| 2011/0057357 A1 | 3/2011 | Feigenblum et al. | |
| 2011/0229720 A1 | 9/2011 | Matsen et al. | |
| 2013/0134154 A1 | 5/2013 | Matsen et al. | |
| 2016/0016355 A1 | 1/2016 | Marcoe et al. | |
| 2016/0159057 A1 | 6/2016 | Butler | |
| 2017/0036310 A1 | 2/2017 | Matsen et al. | |
| 2017/0050229 A1 | 2/2017 | Matsen et al. | |
| 2017/0135157 A1 | 5/2017 | Miller et al. | |
| 2019/0091893 A1 | 3/2019 | Matsen et al. | |

OTHER PUBLICATIONS

European Patent Office Communication and Extended Search Report, dated Mar. 15, 2019, regarding Application No. 18179721.8, 7 pages.

Office Action, dated Feb. 19, 2020, regarding USPTO U.S. Appl. No. 15/713,424, 28 pages.

Notice of Allowance, dated Feb. 18, 2020, regarding USPTO U.S. Appl. No. 15/713,424, 10 pages.

Decision of Rejection dated Feb. 14, 2022 regarding Chinese Patent Application No. 2018110798779; 6 pages.

Notification of First Office Action dated Jun. 29, 2021 regarding Chinese Patent Application No. 2018110798779; 6 pages.

Notice of Allowance, dated Jun. 17, 2020, regarding USPTO U.S. Appl. No. 15/713,424, 10 pages.

Japanese Office Action regarding Japanese Application No. 2018-167907, dated Nov. 1, 2022, 4 pages including English-language translation.

* cited by examiner

INDUCTION FORMING AND CURING OF THERMOSET COMPOSITE CHARGES

CROSS-REFERENCE TO RELATED APPLICATION

This application is a divisional application of U.S. application Ser. No. 15/713,424, entitled "Induction Forming and Curing of Thermoset Composite Charges," filed Sep. 22, 2017, the entirety of which is incorporated herein by reference.

BACKGROUND INFORMATION

1. Field

The present disclosure relates generally to induction tooling, and more specifically, to induction tooling for performing manufacturing operations on thermoset composite charges. Yet more specifically, the present disclosure relates to an induction system configured to both form and cure a thermoset composite charge.

2. Background

Composite materials are tough, light-weight materials created by combining two or more functional components. For example, a composite material may include reinforcing fibers bound in a polymer resin matrix. The fibers may be unidirectional or may take the form of a woven cloth or fabric. The fibers and resin are arranged and cured to form a composite material.

Thermoset composite materials are composite materials having a resin that cures upon application of at least one of temperature or pressure, thus forming the final composite structure. Thermoset composite materials are shaped prior to curing.

In manufacturing composite structures, layers of composite material are laid up. The layers may be comprised of fibers in sheets. These sheets may take the form of fabrics, tape, tows, or other suitable forms. In some cases, resin may be infused or pre-impregnated into the sheets. These types of sheets are commonly referred to as prepreg.

In some examples, thermoset composite structures with complex cross-sections are formed by laying up the complex cross-section layer by layer by hand or using automated lamination equipment such as a tape laminating machine or a fiber placement system. However, laying up complex cross-sections layer by layer may take an undesirable amount of time. Laying up complex cross-sections layer by layer may impact at least one of the amount of manufacturing time for a component, the amount of in-process flow time for a layup tool, or the amount of human operator time.

Thermoset composite structures with complex cross-sections may be created by forming thermoset composite charges. A thermoset composite charge has multiple layers of thermoset prepreg laid up substantially flat. A thermoset composite charge may be laid up flat by a tape laminating machine.

After laying up a thermoset composite charge, the thermoset composite charge may be drape-formed to a complex cross-section. Drape forming uses a forming tool operating at a forming temperature. After drape forming, the formed thermoset composite charge is transferred to a cure tool, such as an autoclave. Separate forming and curing steps may impact overall manufacturing time by adding transfer processes. Additionally, separate forming and curing steps use separate forming and curing tooling.

Therefore, it would be desirable to have a method and apparatus that take into account at least some of the issues discussed above, as well as other possible issues. For example, it may be desirable to provide an apparatus and method for forming thermosets with complex cross-sections with at least one of reduced manufacturing time, reduced manufacturing costs, or reduced utilities. As another example, it may be desirable to provide an apparatus for both forming and curing a thermoset composite charge.

SUMMARY

An illustrative embodiment of the present disclosure provides an induction system configured to provide temperature and pressure control for forming and curing of a thermoset composite charge. The induction system comprises a first tooling die and a second tooling die, a first smart susceptor material, a second smart susceptor material, and a flexible membrane. The first tooling die and the second tooling die are movable with respect to each other. The first tooling die and the second tooling die form a die cavity. The first tooling die and the second tooling die comprise a plurality of stacked metal sheets. A plurality of air gaps is defined between adjacent stacked metal sheets. The first smart susceptor material is within the die cavity and connected to the first tooling die. The first smart susceptor material has a first Curie temperature. The second smart susceptor material is within the die cavity and associated with the second tooling die. The second smart susceptor material has a second Curie temperature lower than the first Curie temperature. The flexible membrane is between the second tooling die and the first smart susceptor material. The flexible membrane is configured to receive pressure.

Another illustrative embodiment of the present disclosure provides an induction system configured to provide temperature and pressure control for forming and curing of a thermoset composite charge. The induction system comprises an induction tool and a conformable smart susceptor blanket positioned within a die cavity of the induction tool. The induction tool comprises a first tooling die and a second tooling die, a first set of conductors, a first smart susceptor surface, and a second smart susceptor surface. The first tooling die and the second tooling die are movable with respect to each other. The first tooling die and the second tooling die comprise a plurality of stacked metal sheets. A plurality of air gaps is defined between adjacent stacked metal sheets. The first smart susceptor surface is connected to the first tooling die. The second smart susceptor surface is connected to the second tooling die.

A further illustrative embodiment of the present disclosure provides a method. A thermoset composite charge is placed within a die cavity of an induction tool, wherein the induction tool comprises a first tooling die and a second tooling die movable with respect to each other, wherein the first tooling die and the second tooling die form the die cavity, the first tooling die and the second tooling die comprising a plurality of stacked metal sheets, a plurality of air gaps defined between adjacent stacked metal sheets. The thermoset composite charge within the die cavity is heated to a forming temperature using a second smart susceptor material within the die cavity. The thermoset composite charge within the die cavity is moved towards a first smart susceptor surface connected to the first tooling die after heating the thermoset composite charge to the forming temperature. Pressure is applied to the thermoset composite charge using a flexible membrane to conform the thermoset composite charge to the first smart susceptor surface. The thermoset composite charge is heated to a curing temperature using the first smart susceptor surface.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that current processing systems for complex small thermoset components require undesirable amounts of labor for hand lay-up and curing. The illustrative embodiments recognize and take into account that heated presses/ovens operating at separate temperatures for forming and curing requires multiple set-ups and processing runs.

Figure 1:
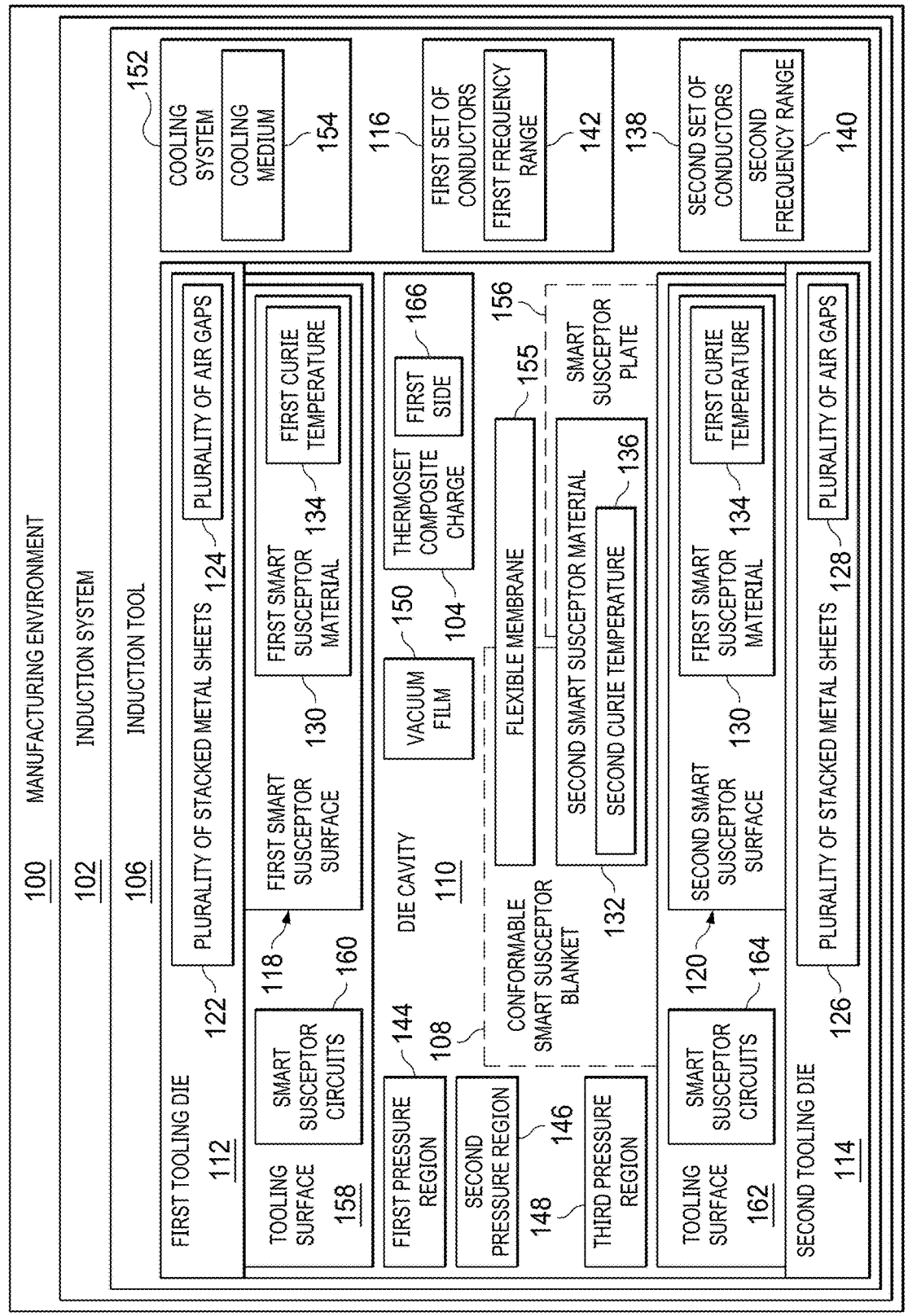
FIG. 1 is an illustration of a block diagram of a manufacturing environment in accordance with an illustrative embodiment.

Referring now to the figures and, in particular, with reference to FIG. 1, an illustration of a block diagram of a manufacturing environment is depicted in accordance with an illustrative embodiment.

Manufacturing environment 100 includes induction system 102 for forming and curing thermoset composite charge 104. Induction system 102 is configured to provide temperature and pressure control for forming and curing of thermoset composite charge 104.

In one illustrative example, induction system 102 comprises induction tool 106 and conformable smart susceptor blanket 108 positioned within die cavity 110 of induction tool 106. Induction tool 106 comprises first tooling die 112, second tooling die 114, first set of conductors 116, first smart susceptor surface 118, and second smart susceptor surface 120. First tooling die 112 and second tooling die 114 are movable with respect to each other. First tooling die 112 and second tooling die 114 comprise a plurality of stacked metal sheets. A plurality of air gaps is defined between the adjacent stacked metal sheets.

First tooling die 112 comprises plurality of stacked metal sheets 122. Plurality of air gaps 124 are defined between adjacent stacked metal sheets of plurality of stacked metal sheets 122.

Second tooling die 114 comprises plurality of stacked metal sheets 126. Plurality of air gaps 128 are defined between adjacent stacked metal sheets of plurality of stacked metal sheets 126.

First smart susceptor material 130 of first smart susceptor surface 118 and second smart susceptor surface 120 has a higher Curie temperature than second smart susceptor material 132 in conformable smart susceptor blanket 108. First Curie temperature 134 of first smart susceptor material 130 is higher than second Curie temperature 136 of second smart susceptor material 132.

Conformable smart susceptor blanket 108 comprises second set of conductors 138 configured to generate second frequency range 140. In some illustrative examples, second frequency range 140 is 100 kHz-400 kHz. In some illustrative examples, second set of conductors 138 is situated to generate a magnetic field cancels out over a short distance. In these illustrative examples, second set of conductors 138 generating second frequency range 140 will not appreciably affect first smart susceptor surface 118 and second smart susceptor surface 120.

In some illustrative examples, second frequency range 140 and first frequency range 142 of first set of conductors 116 may have overlapping frequencies. In these illustrative examples, second Curie temperature 136 of second smart susceptor material 132 protects second smart susceptor material 132 from overheating.

In some illustrative examples, second frequency range 140 is separate from first frequency range 142 of first set of conductors 116. First frequency range 142 and second frequency range 140 may be separated by a gap. In some illustrative examples, first frequency range 142 may be 120 Hz-1300 Hz while second frequency range 140 is 100 kHz-400 kHz.

In some illustrative examples, second set of conductors 138 are oriented at different angles than first set of conductors 116. In some illustrative examples, second set of conductors 138 are oriented at 90 degrees (orthogonal) relative to first set of conductors 116. In some illustrative examples, second set of conductors 138 are oriented at 90 degrees (orthogonal) relative to first set of conductors 116 and used at a different frequency. In some illustrative examples, the difference in orientation of a magnetic field of second set of conductors 138 and a magnetic field of first set of conductors 116 allows second set of conductors 138 to couple well with second smart susceptor material 132, but leave first smart susceptor material 130 relatively alone. In some illustrative examples, the difference in orientation of a magnetic field of second set of conductors 138 and a magnetic field of first set of conductors 116 along with the difference in frequency between first frequency range 142 and second frequency range 140 allows second set of conductors 138 to couple well with second smart susceptor material 132, but leave first smart susceptor material 130 relatively alone.

In these illustrative examples, induction system 102 has first pressure region 144, second pressure region 146, and third pressure region 148. First pressure region 144 is formed by first smart susceptor surface 118 and vacuum film 150. Second pressure region 146 is formed by vacuum film 150 and conformable smart susceptor blanket 108. Third pressure region 148 is formed by conformable smart susceptor blanket 108 and second smart susceptor surface 120.

Each of first pressure region 144, second pressure region 146, and third pressure region 148 has an independently controlled pressure. First pressure region 144, second pressure region 146, and third pressure region 148 are controlled to apply desirable pressures to form and then cure thermoset composite charge 104 positioned between vacuum film 150 and conformable smart susceptor blanket 108. Although each of first pressure region 144, second pressure region 146, and third pressure region 148 is independently controlled, each of first pressure region 144, second pressure region 146, and third pressure region 148 is controlled in concert to form and cure thermoset composite charge 104.

For example, first pressure region 144 is held at a higher pressure than second pressure region 146 and third pressure region 148 during heating of thermoset composite charge 104 to a forming temperature. As another example, the pressure of third pressure region 148 is increased to greater than first pressure region 144 and second pressure region 146 to form thermoset composite charge 104 against first smart susceptor surface 118. To form thermoset composite charge 104, the pressure in first pressure region 144 is reduced. During curing of thermoset composite charge 104, pressure in third pressure region 148 is greater than the pressures in first pressure region 144 and second pressure region 146.

In some illustrative examples, induction system 102 includes cooling system 152. Cooling system 152 is configured to provide cooling medium 154 to a first set of the stacked metal sheets such that the cooling medium passes through the air gaps between the first set of stacked metal sheets. For example, cooling system 152 is configured to provide cooling medium 154 to plurality of stacked metal sheets 122 such that cooling medium 154 passes through plurality of air gaps 124 of plurality of stacked metal sheets 122. In some illustrative examples, cooling system 152 may be used to provide cooling medium 154 to a subset of plurality of air gaps 124. By controlling the application of cooling medium 154, cooling system 152 may be used to provide directed cooling to selected portions of first smart susceptor surface 118.

In some illustrative examples, cooling system 152 is configured to provide cooling medium 154 to plurality of stacked metal sheets 126 such that cooling medium 154 passes through plurality of air gaps 128 of plurality of stacked metal sheets 126. In some illustrative examples, cooling system 152 may be used to provide cooling medium 154 to a subset of plurality of air gaps 128. By controlling the application of cooling medium 154, cooling system 152 may be used to provide directed cooling to selected portions of second smart susceptor surface 120.

In some illustrative examples, induction system 102 comprises first tooling die 112 and second tooling die 114, first smart susceptor material 130, second smart susceptor material 132, and flexible membrane 155. In these illustrative examples, first tooling die 112 and second tooling die 114 are movable with respect to each other. First tooling die 112 and second tooling die 114 form die cavity 110. First tooling die 112 and second tooling die 114 comprise a plurality of stacked metal sheets, and a plurality of air gaps defined between adjacent stacked metal sheets.

First smart susceptor material 130 is within die cavity 110 and connected to first tooling die 112. First smart susceptor material 130 has first Curie temperature 134.

Second smart susceptor material 132 is within die cavity 110 and associated with second tooling die 114. Second smart susceptor material 132 has second Curie temperature 136 lower than first Curie temperature 134.

Flexible membrane 155 is between second tooling die 114 and first smart susceptor material 130. Flexible membrane 155 is configured to receive pressure. More specifically, flexible membrane 155 is configured to receive pressure to form thermoset composite charge 104 against first smart susceptor surface 118.

Induction system 102 has first pressure region 144, second pressure region 146, and third pressure region 148. First pressure region 144 is within die cavity 110 and is formed by first smart susceptor material 130 and vacuum film 150. Second pressure region 146 is within the die cavity 110 and is formed by vacuum film 150 and flexible membrane 155. Third pressure region 148 is within die cavity 110 and is formed by flexible membrane 155 and tooling surface 162 connected to second tooling die 114.

Induction system 102 comprises first set of conductors 116 and second set of conductors 138. First set of conductors 116 generates first frequency range 142. First smart susceptor material 130 is configured to be heated by first frequency range 142. In some illustrative examples, first set of conductors 116 is a first set of induction coils extending through first tooling die 112 and second tooling die 114. In other illustrative examples, first set of conductors 116 could be a number of large beds placed inside die cavity 110 of induction tool 106. It is more energy efficient to have first set of conductors 116 closer to first smart susceptor surface 118 and second smart susceptor surface 120. When first set of conductors 116 is a number of large beds, it may be possible to remove first set of conductors 116 and place them into a different induction tool other than induction tool 106.

Second set of conductors 138 generates second frequency range 140. Second smart susceptor material 132 is configured to be heated by second frequency range 140. In some illustrative examples, when second smart susceptor material 132 is part of conformable smart susceptor blanket 108, second set of conductors 138 may take the form of conductive threads. In some illustrative examples, second set of conductors 138 may be a second plurality of induction coils. In some illustrative examples, second set of conductors 138 may be incorporated into flexible membrane 155. In some illustrative examples, conformable smart susceptor blanket 108 includes second smart susceptor material 132 wrapped in a spiral around second set of conductors 138 in the form of a litz wire. In these illustrative examples, the material and pattern of second set of conductors 138 and second smart susceptor material 132 affects the flexibility of conformable smart susceptor blanket 108. In these illustrative examples, the material and pattern of second set of conductors 138 and second smart susceptor material 132 affects the degree to which conformable smart susceptor blanket 108 stretches.

Second smart susceptor material 132 can be incorporated into any desirable format. In some illustrative examples, second smart susceptor material 132 is a component of conformable smart susceptor blanket 108 positioned within die cavity 110. In some illustrative examples, conformable smart susceptor blanket 108 further comprises flexible membrane 155. When conformable smart susceptor blanket 108 comprises flexible membrane 155, pressure is applied to conformable smart susceptor blanket 108 to form thermoset composite charge 104 to first smart susceptor surface 118.

In some other illustrative examples, second smart susceptor material 132 is smart susceptor plate 156 beneath flexible membrane 155. In these illustrative examples, smart susceptor plate 156 is used to heat thermoset composite charge 104 prior to forming thermoset composite charge 104 to first smart susceptor surface 118 using separate flexible membrane 155.

In some illustrative examples, first smart susceptor material 130 is part of tooling surface 158 with smart susceptor circuits 160 embedded in tooling surface 158. Tooling surface 158 is connected to first tooling die 112. Tooling surface 158 may also be referred to as a first tooling surface. In some illustrative examples, first smart susceptor material 130 is part of tooling surface 162 with smart susceptor circuits 164 embedded in tooling surface 162. Tooling surface 162 is connected to second tooling die 114. Tooling surface 162 may also be referred to as a second tooling surface.

In some illustrative examples, smart susceptor circuits 160 and smart susceptor circuits 164 include first smart susceptor material 130 and first set of conductors 116. In some illustrative examples, smart susceptor circuits 160 and smart susceptor circuits 164 include only first smart susceptor material 130.

As depicted, first smart susceptor material 130 connected to first tooling die 112 is part of a first tooling surface, tooling surface 158, connected to first tooling die 112. A second tooling surface, tooling surface 162, is connected to second tooling die 114. The second tooling surface, tooling surface 162, comprises first smart susceptor material 130.

First smart susceptor material 130 and second smart susceptor material 132 are used to heat thermoset composite charge 104. First, at least one of first smart susceptor material 130 or second smart susceptor material 132 are used to heat thermoset composite charge 104 to a forming temperature.

In some illustrative examples, second smart susceptor material 132 is used to heat thermoset composite charge 104 to a forming temperature. In some illustrative examples, both first smart susceptor material 130 and second smart susceptor material 132 are used to heat thermoset composite charge 104. In some illustrative examples, second smart susceptor material 132 is used to heat at least a portion of thermoset composite charge 104 while first smart susceptor material 130 is used to heat die cavity 110. In some illustrative examples, second smart susceptor material 132 is used to heat first side 166 of thermoset composite charge 104 that faces the second smart susceptor material 132 while first smart susceptor material 130 is used to heat die cavity 110.

After heating thermoset composite charge 104 to a forming temperature, thermoset composite charge 104 is moved towards first smart susceptor material 130. First smart susceptor material 130 is used to heat thermoset composite charge 104 to a curing temperature. Thermoset composite charge 104 is held at the curing temperature for a desired period of time. At least one of first smart susceptor material 130 or cooling system 152 are used to maintain thermoset composite charge 104 at the curing temperature. Afterwards, at least one of first smart susceptor material 130, second smart susceptor material 132, or cooling system 152 are used to cool thermoset composite charge 104 in a controlled fashion.

The illustration of manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative examples, second smart susceptor material 132 is present in flexible membrane 155 while second set of conductors 138 is outside of flexible membrane 155. When second set of conductors 138 is present outside of flexible membrane 155, flexible membrane 155 may have increased flexibility. In some illustrative examples, when second set of conductors 138 is outside of flexible membrane 155, second smart susceptor material 132 is discontinuous within flexible membrane 155. Having second smart susceptor material 132 discontinuous with flexible membrane may increase the flexibility of flexible membrane 155.

When the second set of conductors 138 is outside of flexible membrane 155, first smart susceptor material 130 and second smart susceptor material 132 operate independently due to at least one of design of second set of conductors 138 or shape of second smart susceptor material 132. In some illustrative examples, the skin effect may be used to selectively heat large susceptors over small susceptors. In some illustrative examples in which second smart susceptor material 132 is small, when first frequency range 142 is a low frequency (120-3,000 Hz), first set of conductors 116 would not couple well with second smart susceptor material 132. In these illustrative examples, the magnetic field from first set of conductors 116 would selectively couple with first smart susceptor material 130. When second frequency range 140 for second set of conductors 138 is a high frequency (100-400 kHz), second smart susceptor material 132 will couple. In some of these illustrative examples, first smart susceptor material 130 may also couple to second frequency range 140. At least one of geometry of second smart susceptor material 132 or wave guides may be used to selectively couple second set of conductors 138 to second smart susceptor material 132.

In some illustrative examples, geometry of second smart susceptor material 132 is used to selectively heat small susceptors over large susceptors. For example, second set of conductors 138 may be arranged to concentrate a magnetic field from second set of conductors 138 into flexible membrane 155 using at least one of geometry or wave guides. In some illustrative examples, second smart susceptor material 132 may be shaped to couple with a magnetic field generated by second set of conductors 138.

Figure 2:
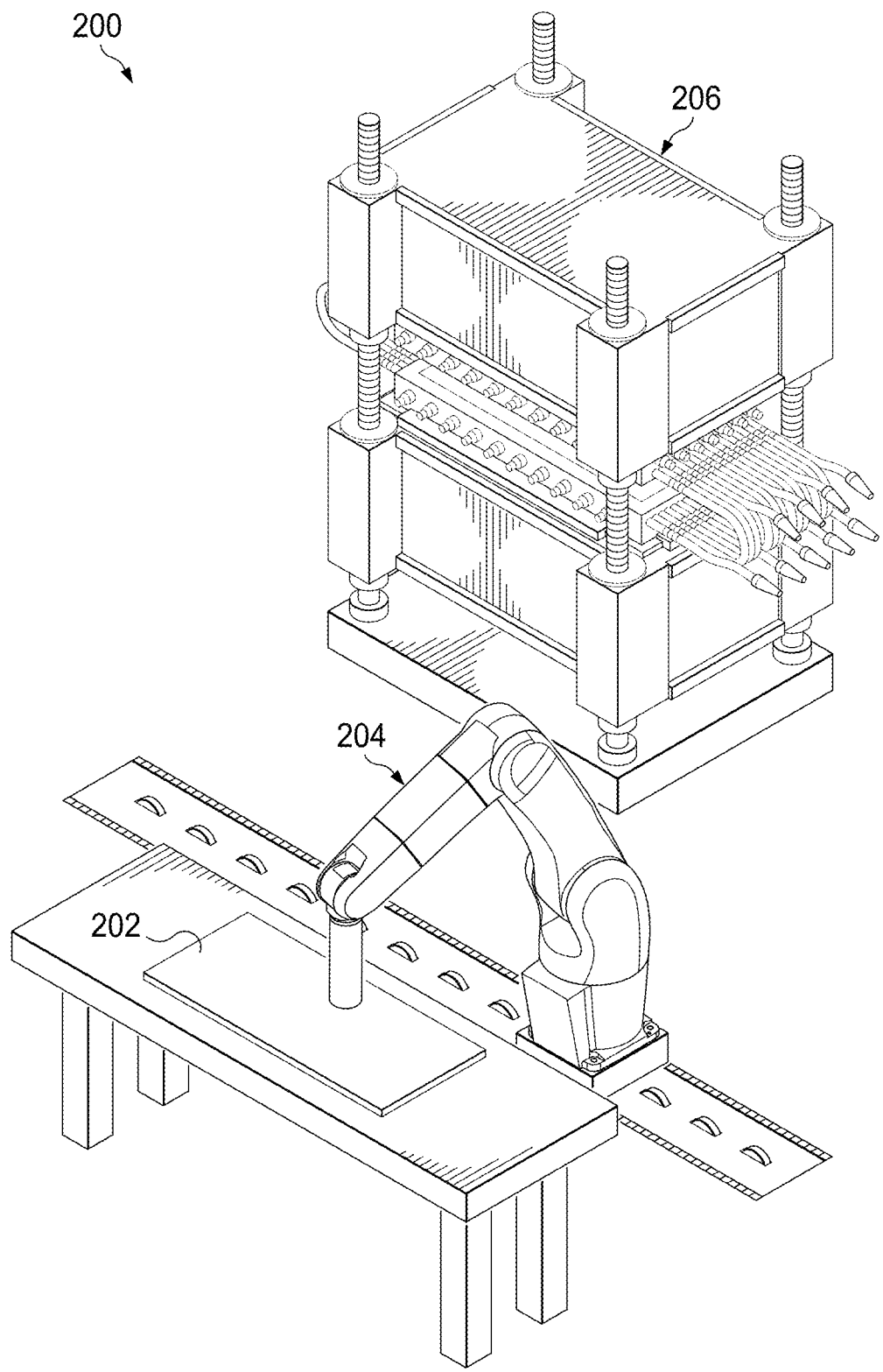
FIG. 2 is an illustration of an isometric view of a manufacturing environment with an induction system for forming and curing thermoset composite charges in accordance with an illustrative embodiment.

Turning now to FIG. 2, an illustration of an isometric view of a manufacturing environment with an induction system for forming and curing thermoset composite charges is depicted in accordance with an illustrative embodiment. Manufacturing environment 200 is a physical implementation of manufacturing environment 100 of FIG. 1.

Thermoset composite charge 202 is present on layup tool 204 in manufacturing environment 200. As depicted, thermoset composite charge 202 is substantially flat.

Layup tool 204 may be one of a plurality of layup tools for thermoset composite charges. When a plurality of layup tools is present, a plurality of thermoset composite charges may be laid up substantially simultaneously. Laying up thermoset composite charge 202 on layup tool 204 may take less time than laying up a thermoset composite structure with a complex cross-section on a complex layup mandrel.

Induction system 206 is present in manufacturing environment 200. Induction system 206 is a physical implementation of induction system 102 of FIG. 1. Induction system 206 is configured to both form and cure thermoset composite charge 202.

Thermoset composite charge 202 is placed into a die cavity of induction system 206. Induction system 206 forms and then cures thermoset composite charge 202. Afterwards, a cured thermoset composite structure with a complex cross-section is removed from induction system 206.

Induction system 206 may have a smaller footprint than separate forming and curing tools. In some illustrative examples, induction system 206 may be smaller than an autoclave. In some illustrative examples, induction system 206 reduces the footprint of manufacturing environment 200 dedicated to manufacturing a thermoset composite structure with a complex cross-section.

In some illustrative examples, operating induction system 206 may take fewer resources than an autoclave. In some illustrative examples, operating induction system 206 may take less processing time than operating an autoclave.

Figure 3:
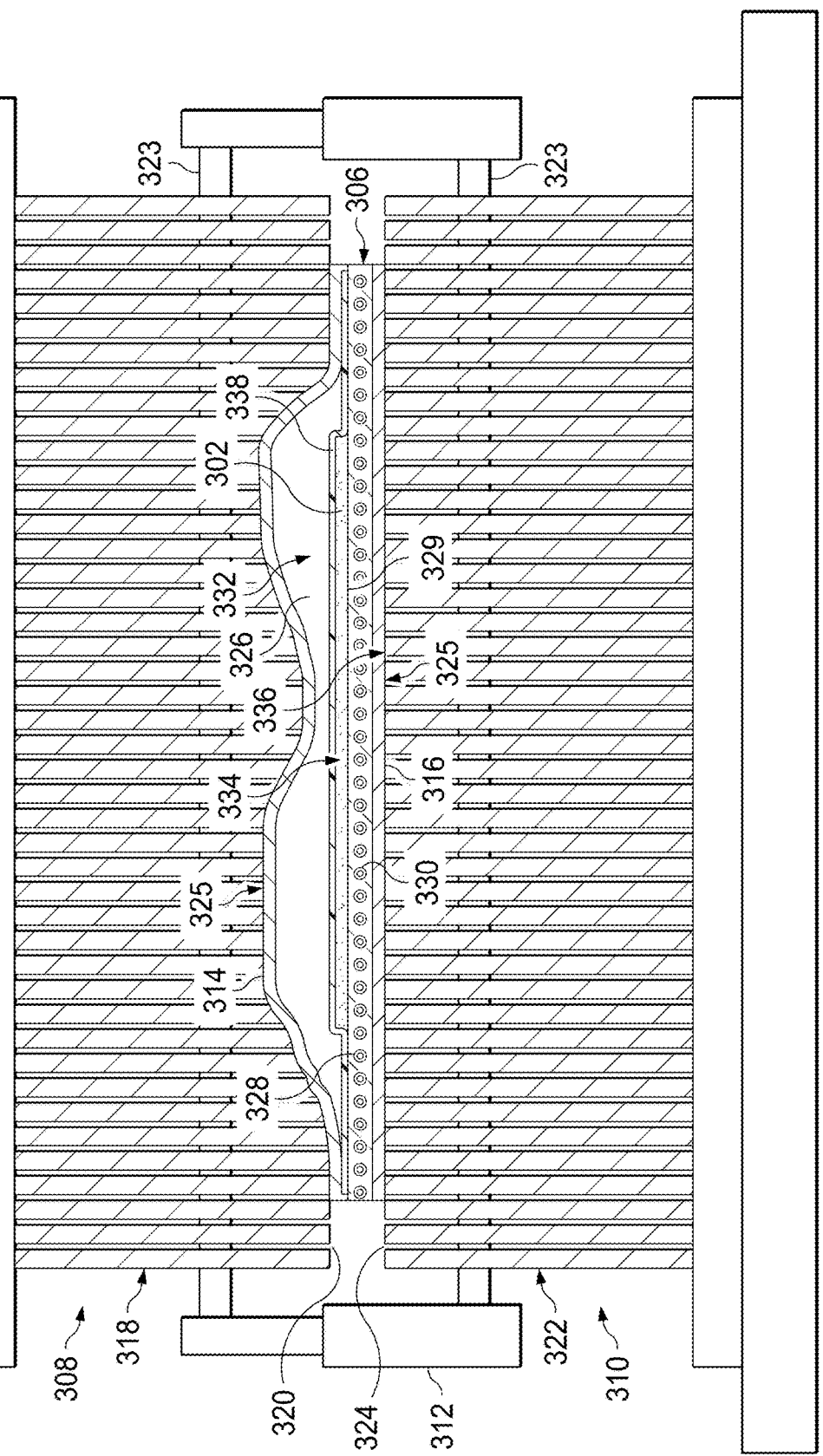
FIG. 3 is an illustration of a cross-sectional view of an induction system for forming and curing thermoset composite charges in accordance with an illustrative embodiment.

Turning now to FIG. 3, an illustration of a cross-sectional view of an induction system for forming and curing thermoset composite charges is depicted in accordance with an illustrative embodiment. Induction system 300 is a physical implementation of induction system 102 of FIG. 1. Induction system 300 may be an implementation of induction system 206 of FIG. 2.

Induction system 300 is configured to provide temperature and pressure control for forming and curing of thermoset composite charge 302. Induction system 300 comprises induction tool 304 and conformable smart susceptor blanket 306.

Induction tool 304 comprises first tooling die 308 and second tooling die 310, first set of conductors 312, first smart susceptor surface 314, and second smart susceptor surface 316. First tooling die 308 and second tooling die 310 are movable with respect to each other. First tooling die 308 and second tooling die 310 comprise a plurality of stacked metal sheets, and a plurality of air gaps defined between adjacent stacked metal sheets.

First tooling die 308 comprises plurality of stacked metal sheets 318. Plurality of air gaps 320 is defined between adjacent stacked metal sheets of plurality of stacked metal sheets 318.

Second tooling die 310 comprises plurality of stacked metal sheets 322. Plurality of air gaps 324 is defined between adjacent stacked metal sheets of plurality of stacked metal sheets 322.

First set of conductors 312 is configured to generate a first frequency range. The first frequency range causes first smart susceptor material 325 to generate heat. As depicted, first set of conductors 312 takes the form of first set of induction coils 323 extending through first tooling die 308 and second tooling die 310.

First smart susceptor surface 314 is connected to first tooling die 308. First smart susceptor surface 314 is formed of first smart susceptor material 325. Second smart susceptor surface 316 is connected to second tooling die 310. Second smart susceptor surface 316 is formed of first smart susceptor material 325.

Conformable smart susceptor blanket 306 is positioned within die cavity 326 of induction tool 304. Conformable smart susceptor blanket 306 includes second smart susceptor material 328. First side 329 of thermoset composite charge 302 faces second smart susceptor material 328. First smart susceptor material 325 has a higher Curie temperature than second smart susceptor material 328.

The forming temperature of thermoset composite charge 302 is lower than the curing temperature of thermoset composite charge 302. Having two smart susceptor materials with two different Curie temperatures allows for controlled application of heat to thermoset composite charge 302 at two different temperatures. Second smart susceptor material 328 is used to control heating of thermoset composite charge 302 to the forming temperature. The second Curie temperature allows for controlled heating to the forming temperature.

First smart susceptor material 325 is used to control heating of thermoset composite charge 302 to the curing temperature. The first Curie temperature allows for controlled heating to the curing temperature.

Conformable smart susceptor blanket 306 also has second set of conductors 330. Second set of conductors 330 are configured to generate a second frequency range separate from the first frequency range of first set of conductors 312.

To form thermoset composite charge 302, induction system 300 heats thermoset composite charge 302 to a forming temperature. In some illustrative examples, conformable smart susceptor blanket 306 heats thermoset composite charge 302 to the forming temperature. In some illustrative examples, first smart susceptor surface 314 and second smart susceptor surface 316 are used to heat die cavity 326 in addition to conformable smart susceptor blanket 306 heating thermoset composite charge 302. In these illustrative examples, first smart susceptor surface 314 and second smart susceptor surface 316 may be heated to a temperature below the forming temperature.

To cure thermoset composite charge 302, induction system 300 heats thermoset composite charge 302 to a curing temperature. In some illustrative examples, first smart susceptor surface 314 heats thermoset composite charge 302 to the curing temperature. In some illustrative examples, first smart susceptor surface 314 heats thermoset composite charge 302 while cooling system 331 simultaneously cools portions of first smart susceptor surface 314. For example, thermoset composite charge 302 may have exothermic curing reactions. The exothermic reactions during curing may heat first smart susceptor surface 314 past the first Curie temperature. Cooling system 331 may cool first smart susceptor surface 314 to below the first Curie temperature.

Induction system 300 has first pressure region 332, second pressure region 334, and third pressure region 336. First pressure region 332 is formed by first smart susceptor surface 314 and vacuum film 338. Second pressure region 334 is formed by vacuum film 338 and conformable smart susceptor blanket 306. Thermoset composite charge 302 is positioned between vacuum film 338 and conformable smart susceptor blanket 306. Third pressure region 336 is formed by conformable smart susceptor blanket 306 and second smart susceptor surface 316.

Conformable smart susceptor blanket 306 acts as a flexible membrane. When an increased pressure is introduced to third pressure region 336, conformable smart susceptor blanket 306 applies pressure to thermoset composite charge 302 to form thermoset composite charge 302 against first smart susceptor surface 314.

Each of first pressure region 332, second pressure region 334, and third pressure region 336 are individually controlled to form and cure thermoset composite charge 302. First pressure region 332, second pressure region 334, and third pressure region 336 work in concert to form and cure thermoset composite charge 302.

The illustration of induction system 300 in FIG. 3 is not meant to imply architectural limitations as to the manner in which different illustrative embodiments may be implemented. For example, first smart susceptor surface 314 is depicted as a "top" tooling surface. In other non-depicted illustrative examples, first smart susceptor surface 314 is a "bottom" tooling surface.

As another example, third pressure region 336 may not be formed by conformable smart susceptor blanket 306. In this non-depicted example, third pressure region 336 may be formed by a separate flexible membrane. In this non-depicted example, conformable smart susceptor blanket 306 remains stationary.

Figure 4:
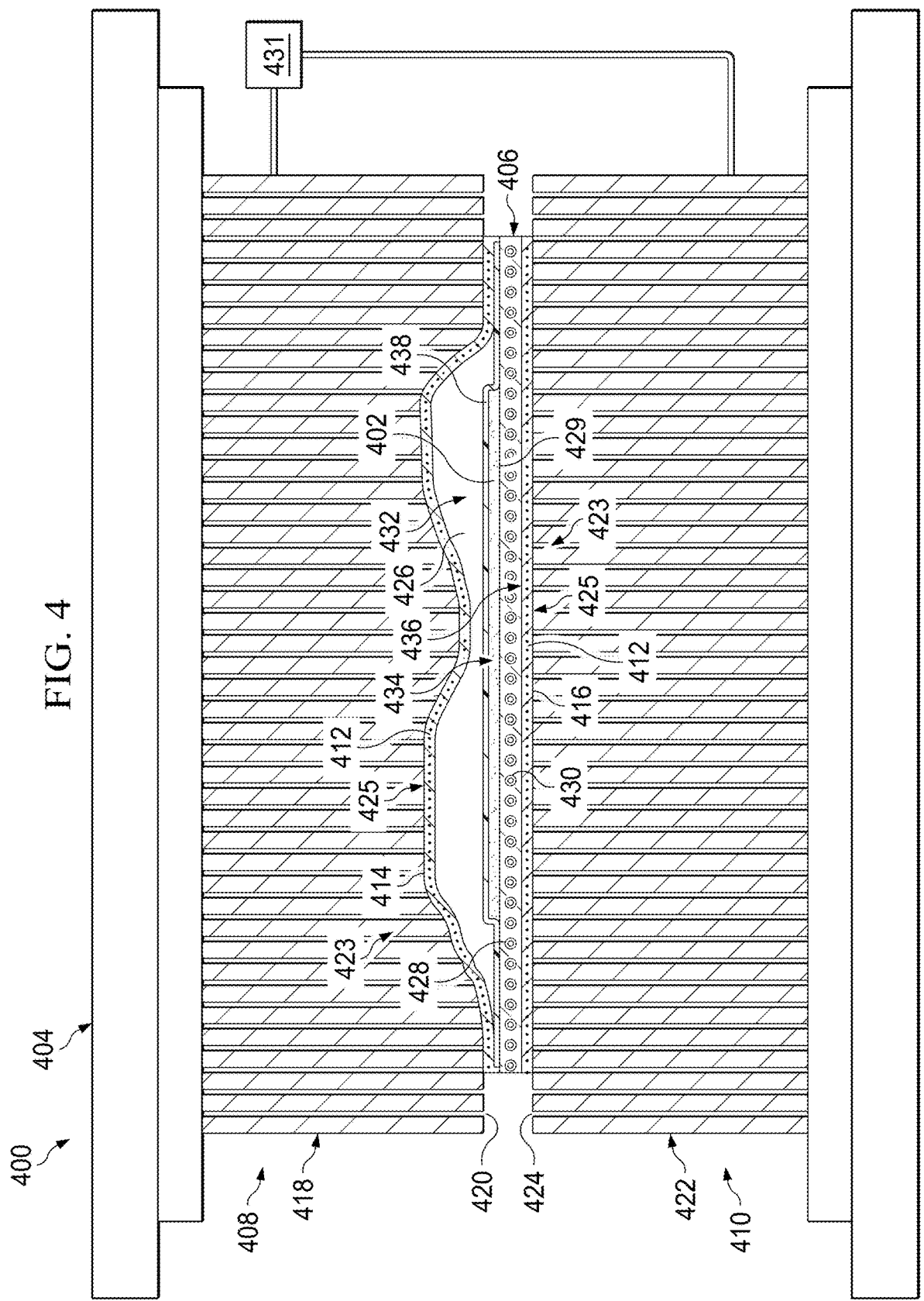
FIG. 4 is an illustration of a cross-sectional view of an induction system for forming and curing thermoset composite charges in accordance with an illustrative embodiment.

Turning now to FIG. 4, an illustration of a cross-sectional view of an induction system for forming and curing thermoset composite charges is depicted in accordance with an illustrative embodiment. Induction system 400 is a physical implementation of induction system 102 of FIG. 1. Induction system 400 may be an implementation of induction system 206 of FIG. 2.

Induction system 400 is configured to provide temperature and pressure control for forming and curing of thermoset composite charge 402. Induction system 400 comprises induction tool 404 and conformable smart susceptor blanket 406.

Induction tool 404 comprises first tooling die 408, second tooling die 410, first set of conductors 412, tooling surface 414, and second tooling surface 416. First tooling die 408 and second tooling die 410 are movable with respect to each other. First tooling die 408 and second tooling die 410 comprise a plurality of stacked metal sheets, and a plurality of air gaps defined between adjacent stacked metal sheets.

First tooling die 408 comprises plurality of stacked metal sheets 418. Plurality of air gaps 420 is defined between adjacent stacked metal sheets of plurality of stacked metal sheets 418.

Second tooling die 410 comprises plurality of stacked metal sheets 422. Plurality of air gaps 424 is defined between adjacent stacked metal sheets of plurality of stacked metal sheets 422.

First set of conductors 412 is configured to generate a first frequency range. As depicted, first set of conductors 412 takes the form of smart susceptor circuits 423 extending through first tooling die 408 and second tooling die 410.

Tooling surface 414 is connected to first tooling die 408. Tooling surface 414 has embedded smart susceptor circuits 423. Tooling surface 414 has first smart susceptor material 425. Tooling surface 416 is connected to second tooling die 410. Tooling surface 416 has embedded smart susceptor circuits 423. Tooling surface 416 has first smart susceptor material 425.

Conformable smart susceptor blanket 406 is positioned within die cavity 426 of induction tool 404. Conformable smart susceptor blanket 406 includes second smart susceptor material 428. First side 429 of thermoset composite charge 402 faces second smart susceptor material 428. First smart susceptor material 425 has a higher Curie temperature than second smart susceptor material 428.

The forming temperature of thermoset composite charge 402 is lower than the curing temperature of thermoset composite charge 402. Having two smart susceptor materials with two different Curie temperatures allows for controlled application of heat to thermoset composite charge 402 at two different temperatures. Second smart susceptor material 428 is used to control heating of thermoset composite charge 402 to the forming temperature. The second Curie temperature allows for controlled heating to the forming temperature.

First smart susceptor material 425 is used to control heating of thermoset composite charge 402 to the curing temperature. The first Curie temperature allows for controlled heating to the curing temperature.

Conformable smart susceptor blanket 406 also has second set of conductors 430. Second set of conductors 430 are configured to generate a second frequency range separate from the first frequency range of first set of conductors 412.

To form thermoset composite charge 402, induction system 400 heats thermoset composite charge 402 to a forming temperature. In some illustrative examples, conformable smart susceptor blanket 406 heats thermoset composite charge 402 to the forming temperature. In some illustrative examples, tooling surface 414 and tooling surface 416 are used to heat die cavity 426 in addition to conformable smart susceptor blanket 406 heating thermoset composite charge 402. In these illustrative examples, tooling surface 414 and tooling surface 416 may be heated to a temperature below the forming temperature.

To cure thermoset composite charge 402, induction system 400 heats thermoset composite charge 402 to a curing temperature. In some illustrative examples, tooling surface 414 heats thermoset composite charge 402 to the curing temperature. In some illustrative examples, tooling surface 414 heats thermoset composite charge 402 while cooling system 431 simultaneously cools portions of tooling surface 414. For example, thermoset composite charge 402 may have exothermic curing reactions. The exothermic reactions may heat tooling surface 414 past the first Curie temperature. Cooling system 431 may cool tooling surface 414 to below the first Curie temperature.

Induction system 400 has first pressure region 432, second pressure region 434, and third pressure region 436. First pressure region 432 is formed by tooling surface 414 and vacuum film 438. Second pressure region 434 is formed by vacuum film 438 and conformable smart susceptor blanket 406. Thermoset composite charge 402 is positioned between vacuum film 438 and conformable smart susceptor blanket 406. Third pressure region 436 is formed by conformable smart susceptor blanket 406 and tooling surface 416.

Conformable smart susceptor blanket 406 acts as a flexible membrane. When an increased pressure is introduced to third pressure region 436, conformable smart susceptor blanket 406 applies pressure to thermoset composite charge 402 to form thermoset composite charge 402 against tooling surface 414.

Each of first pressure region 432, second pressure region 434, and third pressure region 436 are individually controlled to form and cure thermoset composite charge 402. First pressure region 432, second pressure region 434, and third pressure region 436 work in concert to form and cure thermoset composite charge 402.

The illustration of induction system 400 in FIG. 4 is not meant to imply architectural limitations as to the manner in which different illustrative embodiments may be implemented. For example, tooling surface 414 is depicted as a "top" tooling surface. In other non-depicted illustrative examples, tooling surface 414 is a "bottom" tooling surface.

As another example, third pressure region 436 may not be formed by conformable smart susceptor blanket 406. In this non-depicted example, third pressure region 436 may be formed by a separate flexible membrane. In this non-depicted example, conformable smart susceptor blanket 406 remains stationary.

As yet another example, conformable smart susceptor blanket 406 is not present. In this example, a different structure containing second smart susceptor material 428 is present. In one non-depicted example, a smart susceptor plate containing second smart susceptor material 428 may be present.

Figure 5:
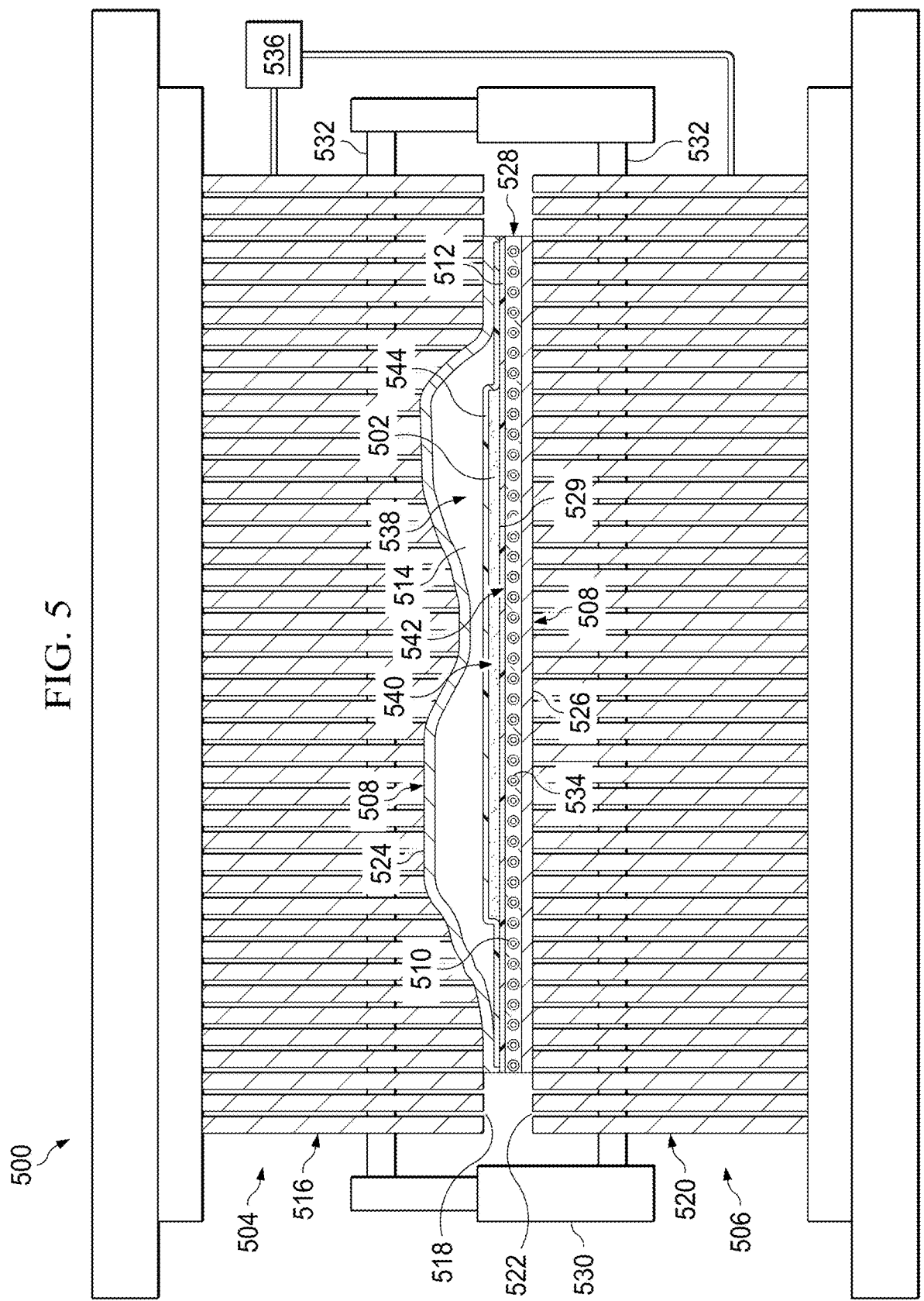
FIG. 5 is an illustration of a cross-sectional view of an induction system for forming and curing thermoset composite charges in accordance with an illustrative embodiment.

Turning now to FIG. 5, an illustration of a cross-sectional view of an induction system for forming and curing thermoset composite charges is depicted in accordance with an illustrative embodiment. Induction system 500 is a physical implementation of induction system 102 of FIG. 1. Induction system 500 may be an implementation of induction system 206 of FIG. 2.

Induction system 500 is configured to provide temperature and pressure control for forming and curing of thermoset composite charge 502. Induction system 500 comprises first tooling die 504 and second tooling die 506, first smart susceptor material 508, second smart susceptor material 510, and flexible membrane 512.

First tooling die 504 and second tooling die 506 are movable with respect to each other. First tooling die 504 and second tooling die 506 form die cavity 514. First tooling die 504 and second tooling die 506 comprise a plurality of stacked metal sheets, and a plurality of air gaps defined between adjacent stacked metal sheets.

First tooling die 504 comprises plurality of stacked metal sheets 516. Plurality of air gaps 518 is defined between adjacent stacked metal sheets of plurality of stacked metal sheets 516.

Second tooling die 506 comprises plurality of stacked metal sheets 520. Plurality of air gaps 522 is defined between adjacent stacked metal sheets of plurality of stacked metal sheets 520.

First smart susceptor material 508 is within die cavity 514 and is connected to first tooling die 504. First smart susceptor material 508 connected to first tooling die 504 forms first smart susceptor surface 524. First smart susceptor material 508 connected to second tooling die 506 forms second smart susceptor surface 526. First smart susceptor material 508 has a first Curie temperature.

Second smart susceptor material 510 is within die cavity 514 and is associated with second tooling die 506. As depicted, second smart susceptor material 510 takes the form of smart susceptor plate 528. Smart susceptor plate 528 is positioned beneath flexible membrane 512. Smart susceptor plate 528 is positioned between flexible membrane 512 and second smart susceptor surface 526. Smart susceptor plate 528 rests on second smart susceptor surface 526. Second smart susceptor material 510 has a second Curie temperature which is lower than the first Curie temperature.

The forming temperature of thermoset composite charge 502 is lower than the curing temperature of thermoset composite charge 502. Having two smart susceptor materials with two different Curie temperatures allows for controlled application of heat to thermoset composite charge 502 at two different temperatures. Second smart susceptor material 510 is used to control heating of thermoset composite charge 502 to the forming temperature. The second Curie temperature allows for controlled heating to the forming temperature.

First smart susceptor material 508 is used to control heating of thermoset composite charge 502 to the curing temperature. The first Curie temperature allows for controlled heating to the curing temperature.

Flexible membrane 512 is positioned between second tooling die 506 and first smart susceptor material 508 connected to first tooling die 504. Flexible membrane 512 is configured to receive pressure.

First set of conductors 530 is configured to generate a first frequency range. The first frequency range causes first smart susceptor material 508 to generate heat. As depicted, first set of conductors 530 takes the form of first set of induction coils 532 extending through first tooling die 504 and second tooling die 506.

Second set of conductors 534 generates a second frequency range. Second smart susceptor material 510 is configured to be heated by the second frequency range.

To form thermoset composite charge 502, induction system 500 heats thermoset composite charge 502 to a forming temperature. In some illustrative examples, smart susceptor plate 528 heats thermoset composite charge 502 to the forming temperature. In some illustrative examples, first smart susceptor surface 524 and second smart susceptor surface 526 are used to heat die cavity 514 in addition to smart susceptor plate 528 heating thermoset composite charge 502. In these illustrative examples, first smart susceptor surface 524 and second smart susceptor surface 526 may be heated to a temperature below the forming temperature. In these illustrative examples, smart susceptor plate 528 heats first side 529 of thermoset charge 502.

To cure thermoset composite charge 502, induction system 500 heats thermoset composite charge 502 to a curing temperature. In some illustrative examples, first smart susceptor surface 524 heats thermoset composite charge 502 to the curing temperature. In some illustrative examples, first smart susceptor surface 524 heats thermoset composite charge 502 while cooling system 536 simultaneously cools portions of first smart susceptor surface 524. For example, thermoset composite charge 502 may have exothermic curing reactions. The exothermic reactions may heat first smart susceptor surface 524 past the first Curie temperature. Cooling system 536 may cool first smart susceptor surface 524 to below the first Curie temperature.

Induction system 500 has first pressure region 538, second pressure region 540, and third pressure region 542. First pressure region 538 is formed by first smart susceptor surface 524 and vacuum film 544. Second pressure region 540 is formed by vacuum film 544 and flexible membrane 512. Thermoset composite charge 502 is positioned between vacuum film 544 and flexible membrane 512. Third pressure region 542 is formed by flexible membrane 512 and second smart susceptor surface 526. When an increased pressure is introduced to third pressure region 542, flexible membrane 512 applies pressure to thermoset composite charge 502 to form thermoset composite charge 502 against first smart susceptor surface 524.

Each of first pressure region 538, second pressure region 540, and third pressure region 542 is individually controlled to form and cure thermoset composite charge 502. First pressure region 538, second pressure region 540, and third pressure region 542 work in concert to form and cure thermoset composite charge 502.

The illustration of induction system 500 in FIG. 5 is not meant to imply architectural limitations as to the manner in which different illustrative embodiments may be implemented. For example, first smart susceptor surface 524 is depicted as a "top" tooling surface. In other non-depicted illustrative examples, first smart susceptor surface 524 is a "bottom" tooling surface. As another example, first set of conductors 530 may instead be smart susceptor circuits.

Figure 6:
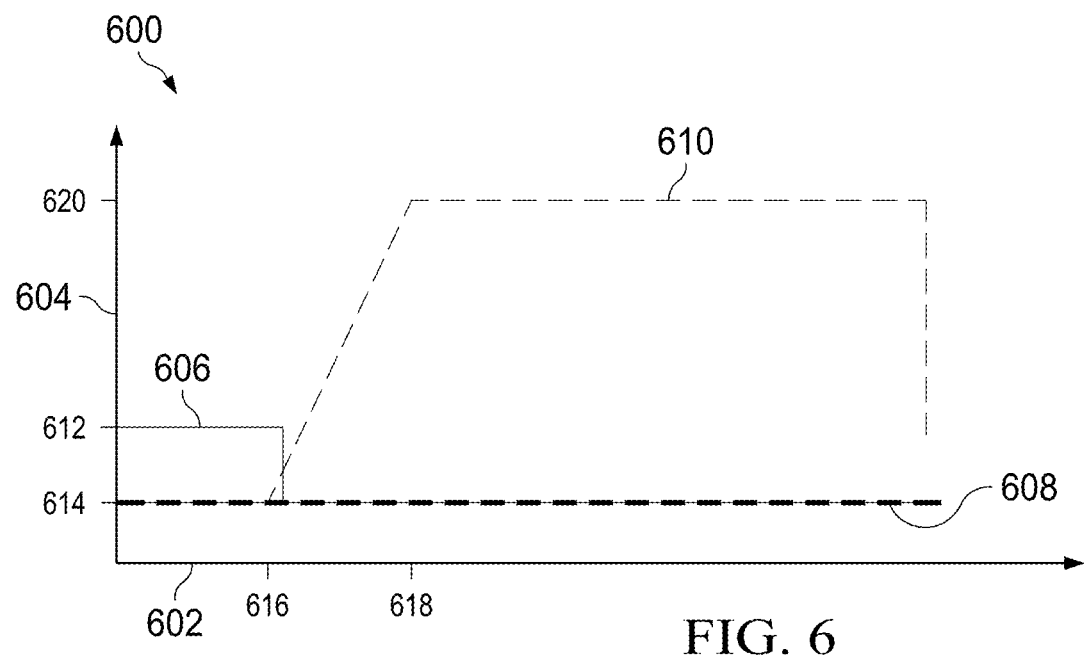
FIG. 6 is an illustration of a pressure versus time chart of forming and curing a thermoset composite charge in an induction system in accordance with an illustrative embodiment.

Turning now to FIG. 6, an illustration of a pressure versus time chart of forming and curing a thermoset composite charge in an induction system is depicted in accordance with an illustrative embodiment. Chart 600 is an illustrative example of pressures within pressure regions, such as first pressure region 144, second pressure region 146, and third pressure region 148, of induction system 102 of FIG. 1. Chart 600 is an illustrative example of pressures within pressure regions of induction system 206 of FIG. 2. Chart 600 is an illustrative example of pressures within pressure regions, such as first pressure region 332, second pressure region 334, and third pressure region 336, of induction system 300 of FIG. 3. Chart 600 is an illustrative example of pressures within pressure regions, such as first pressure region 432, second pressure region 434, and third pressure region 436, of induction system 400 of FIG. 4. Chart 600 is an illustrative example of pressures within pressure regions, such as first pressure region 538, second pressure region 540, and third pressure region 542, of induction system 500 of FIG. 5.

Chart 600 has x-axis 602 and y-axis 604. X-axis 602 is a representation of time. Y-axis 604 is a representation of pressure. Line 606 is representative of a first pressure region in an induction system. The first pressure zone is within a die cavity of the induction system and is formed by a first smart susceptor material and a vacuum film. Line 608 is representative of a second pressure region in the induction system. The second pressure region is within the die cavity and is formed by the vacuum film and a flexible membrane. Line 610 is representative of a third pressure region in the induction system. The third pressure region is within the die cavity and is formed by the flexible membrane and a second smart susceptor surface connected to the second tooling die of the induction system.

Prior to forming, line 608 and line 610 start below line 606. In this illustrative example, line 606 begins at pressure 612 while line 608 and line 610 begin at pressure 614. Pressure 614 is less than pressure 612. By starting line 606 at pressure 612 greater than pressure 614, a thermoset composite charge between the flexible membrane and the vacuum film is encouraged towards the flexible membrane. Line 606 having a higher pressure than line 608 and line 610 allows the flexible membrane to capture the thermoset composite charge for movement.

In some illustrative examples, line 606 begins at ambient pressure while line 608 and line 610 begin at vacuum pressure. In some illustrative examples, line 608 and line 610 may begin at ambient pressure while line 606 is at an elevated pressure.

Forming begins at time 616. At time 616, line 610 begins to increase in pressure. At or slightly after time 616, line 606 decreases in pressure. By increasing the pressure between the flexible membrane and a tooling surface connected to the second tooling die, represented by line 610, the thermoset composite charge between the flexible membrane and the vacuum film is propelled towards the first smart susceptor material. By decreasing the pressure between the first smart susceptor material and the vacuum film, represented by line 606, gas does not prevent the thermoset composite charge from forming against the first smart susceptor material.

At time 618, line 610 has reached pressure 620. Pressure 620 is a desired curing pressure. Line 610 is maintained at pressure 620 during curing of the thermoset composite charge.

Line 610 is maintained at pressure 620 during a controlled cooldown of the thermoset composite charge. After curing and cooling down of the thermoset composite charge, pressure is released from the third pressure region.

Figure 7:
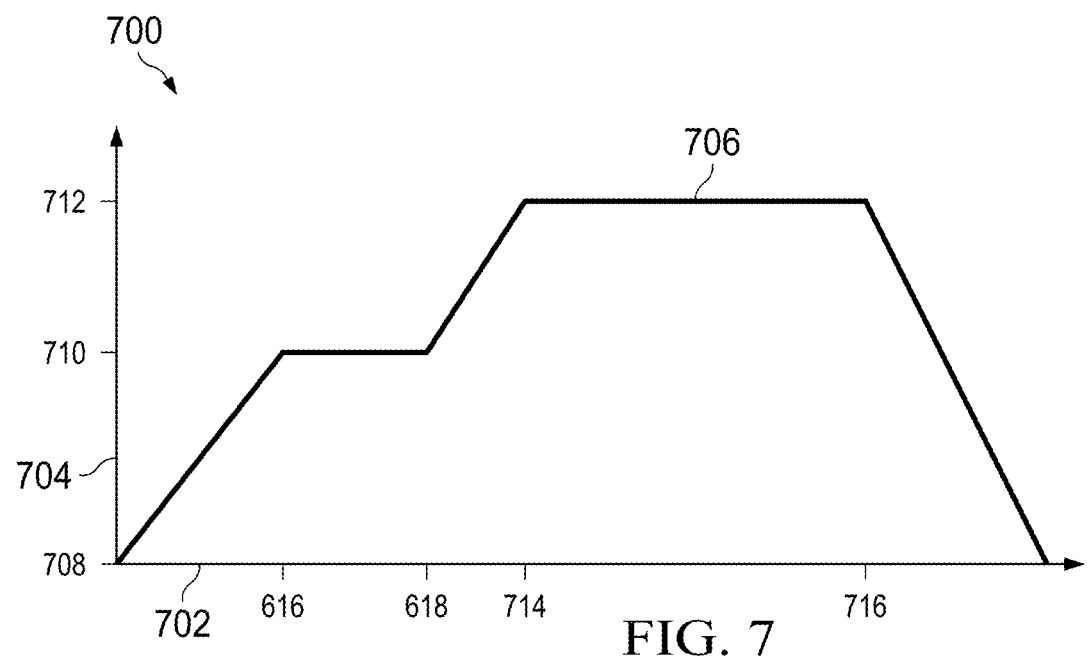
FIG. 7 is an illustration of a temperature versus time chart of forming and curing a thermoset composite charge in an induction system in accordance with an illustrative embodiment.

Turning now to FIG. 7, an illustration of a temperature versus time chart of forming and curing a thermoset composite charge in an induction system is depicted in accordance with an illustrative embodiment. Chart 700 is an illustrative example of temperatures of thermoset composite charge 104 during forming and curing in induction system 102 of FIG. 1. Chart 700 is an illustrative example of temperatures of a thermoset composite charge 202 during forming and curing in induction system 206 of FIG. 2. Chart 700 is an illustrative example of temperatures of thermoset composite charge 302 during forming and curing in induction system 300 of FIG. 3. Chart 700 is an illustrative example of temperatures of thermoset composite charge 402 during forming and curing in induction system 400 of FIG. 4. Chart 700 is an illustrative example of temperatures of thermoset composite charge 502 during forming and curing in induction system 500 of FIG. 5. Chart 700 is an illustrative example of temperatures of a thermoset composite charge formed and cured using the pressures shown in chart 600 of FIG. 6.

Chart 700 has x-axis 702 and y-axis 704. X-axis 702 is a representation of time. Y-axis 704 is a representation of temperature. Line 706 is representative of a temperature of a thermoset composite charge between a flexible membrane and a vacuum film in an induction system.

Line 706 starts at temperature 708 and heats to temperature 710 by time 616. Increasing the temperature of a thermoset composite charge represented by line 706 is performed by heating a second smart susceptor material within a die cavity of the induction system. The second smart susceptor material has a second Curie temperature and is configured to heat the thermoset composite charge to temperature 710. In some illustrative examples, a first smart susceptor material having a first Curie temperature higher than the second Curie temperature may be used to heat the die cavity of the induction system. In these illustrative examples, the first smart susceptor material is heated to a temperature below the forming temperature. Heating the die cavity using the first smart susceptor material aids in heating the entirety of the thermoset composite charge to the forming temperature.

Forming of the thermoset composite charge by application of pressure begins at time 616. Forming takes place from time 616 to time 618. The application of pressure during forming can be seen in FIG. 6 between time 616 and time 618. During forming, line 706 maintains temperature 710 from time 616 to time 618. Temperature 710 may be referred to as a forming temperature.

Following forming, the thermoset composite charge has been shaped to the first smart susceptor material. At time 618, the thermoset composite charge has been shaped to the first smart susceptor material.

At time 618, line 706 starts at temperature 710 and heats to temperature 712 by time 714. Increasing the temperature of a thermoset composite charge represented by line 706 is performed by heating the first smart susceptor material.

Temperature 712 is a curing temperature for the thermoset composite charge. Line 706 is maintained at temperature 712 from time 714 to time 716. Line 706 is maintained at temperature 712 using the first smart susceptor material. In some illustrative examples, a cooling system is used to cool the first smart susceptor material if the first smart susceptor material exceeds a Curie temperature of the first smart susceptor material. In some illustrative examples, exothermic reactions of the thermoset composite charge cause the first smart susceptor material to locally exceed the Curie temperature. In these illustrative examples, a combination of heating using the first smart susceptor material and cooling using the cooling system is used to maintain line 706 at temperature 712.

The thermoset composite charge is cured from time 714 to 716. At time 716, a controlled cooldown of the thermoset composite charge begins. At time 716, line 706 decreases in temperature from temperature 712 to temperature 708. The controlled cooldown includes the application of both heat and cooling to the thermoset composite charge. In some illustrative examples, the controlled cooldown includes simultaneously cooling the first smart susceptor surface and applying heat using a conformable smart susceptor blanket.

Figure 8:
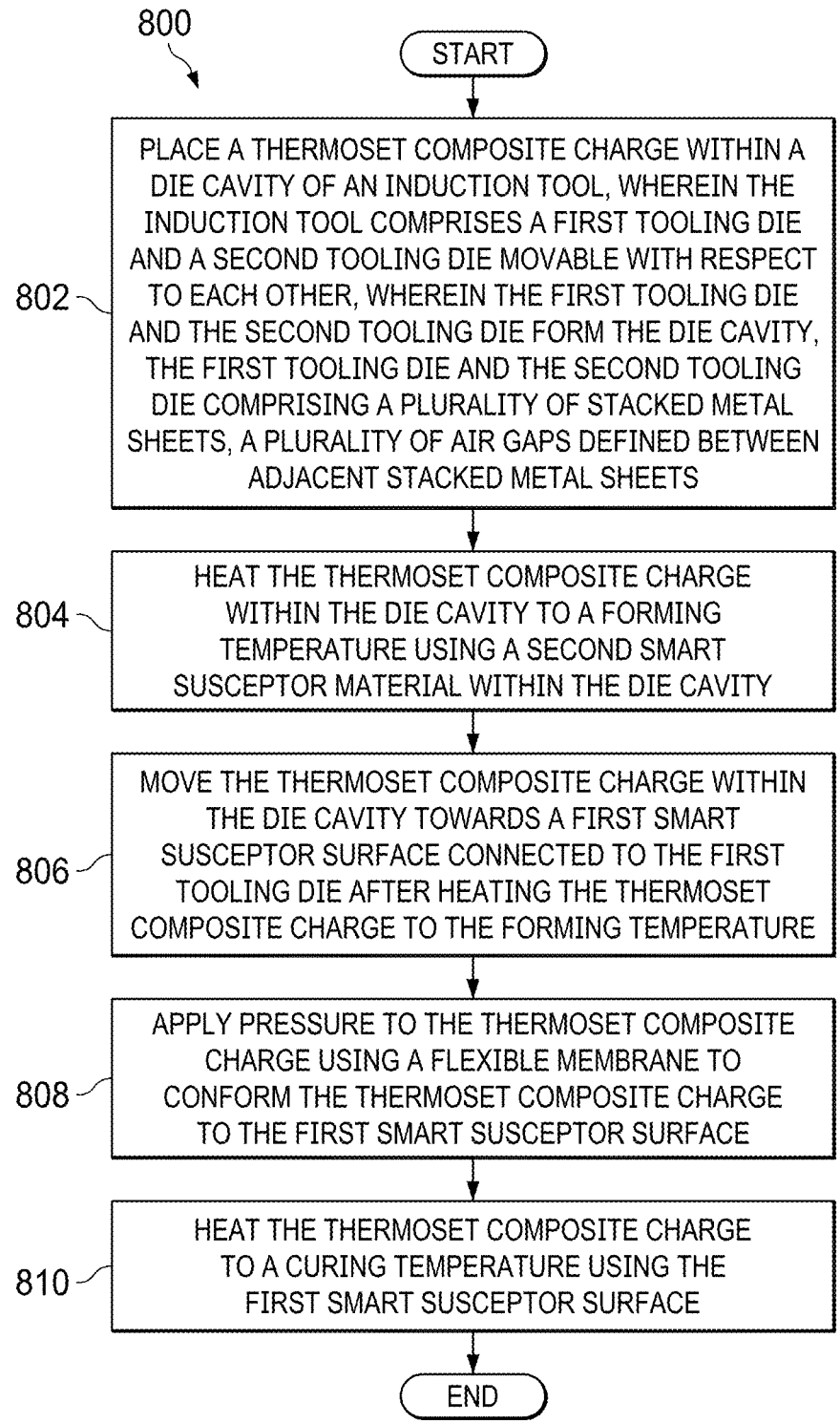
FIG. 8 is an illustration of a flowchart of a process for forming and curing a thermoset composite charge in accordance with an illustrative embodiment.

Turning now to FIG. 8, an illustration of a flowchart of a process for forming and curing a thermoset composite charge is depicted in accordance with an illustrative embodiment. Method 800 may be used to form and cure thermoset composite charge 104 using induction system 102 of FIG. 1. Method 800 may be used to form and cure thermoset composite charge 202 using induction system 206 of FIG. 2. Method 800 may be used to form and cure thermoset composite charge 302 using induction system 300 of FIG. 3. Method 800 may be used to form and cure thermoset composite charge 402 using induction system 400 of FIG. 4. Method 800 may be used to form and cure thermoset composite charge 502 using induction system 500 of FIG. 5.

Method 800 places a thermoset composite charge within a die cavity of an induction tool, wherein the induction tool comprises a first tooling die and a second tooling die movable with respect to each other, and wherein the first tooling die and the second tooling die form the die cavity, the first tooling die and the second tooling die comprising a plurality of stacked metal sheets, a plurality of air gaps defined between adjacent stacked metal sheets (operation 802). Method 800 heats the thermoset composite charge within the die cavity to a forming temperature using a second smart susceptor material within the die cavity (operation 804). The second smart susceptor material is a component of any desirable structure.

In some illustrative examples, the second smart susceptor material is a component of a conformable smart susceptor blanket. In other illustrative examples, the second smart susceptor material is part of a smart susceptor plate. In one illustrative example, the second smart susceptor material is part of a smart susceptor plate with smart susceptor circuits.

In some illustrative examples, heating the thermoset composite charge to the forming temperature comprises heating the thermoset composite charge using a conformable smart susceptor blanket positioned within the die cavity, wherein the conformable smart susceptor blanket comprises the second smart susceptor material. In some illustrative examples, heating the thermoset composite charge within the die cavity to the forming temperature using the second smart susceptor material comprises heating a first side of the thermoset composite charge using the second smart susceptor material, and heating the die cavity using the first smart susceptor surface. In some illustrative examples, heating the thermoset composite charge to the forming temperature comprises generating a second frequency range using a second set of conductors in the conformable smart susceptor blanket.

Method 800 moves the thermoset composite charge within the die cavity towards a first smart susceptor surface connected to the first tooling die after heating the thermoset composite charge to the forming temperature (operation 806). Method 800 moves the thermoset composite charge using a flexible membrane. In some illustrative examples, a conformable smart susceptor blanket comprises the flexible membrane. In some illustrative examples, moving the thermoset composite charge within the die cavity comprises increasing a pressure between the conformable smart susceptor blanket and a second smart susceptor surface connected to the second tooling die, wherein the conformable smart susceptor blanket comprises the flexible membrane.

Method 800 applies pressure to the thermoset composite charge using a flexible membrane to conform the thermoset composite charge to the first smart susceptor surface (operation 808). Method 800 heats the thermoset composite charge to a curing temperature using the first smart susceptor surface (operation 810). Afterwards, the method terminates.

In some illustrative examples, heating the thermoset composite charge to the curing temperature comprises generating a first frequency range using a first plurality of conductors, wherein the first smart susceptor material is configured to be heated by the first frequency range.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, method 800 further comprises cooling portions of the first smart susceptor surface to below a first Curie temperature of the first smart susceptor surface. In some illustrative examples, method 800 further comprises cooling the thermoset composite charge in a controlled fashion by simultaneously cooling the first smart susceptor surface using cooling medium flowing through the plurality of air gaps of the first tooling die and applying heat from the conformable smart susceptor blanket.

Figure 9:
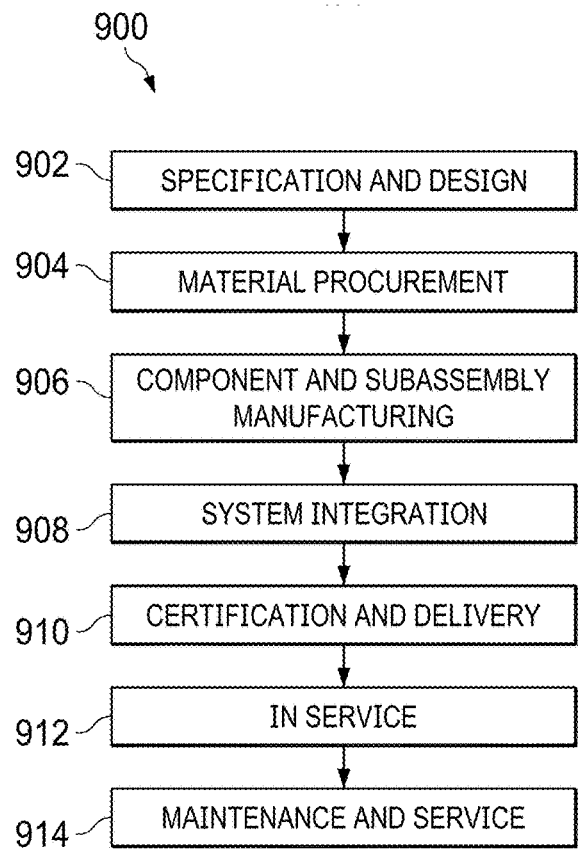
FIG. 9 is an illustration of an aircraft manufacturing and service method in the form of a block diagram in accordance with an illustrative embodiment.
Figure 10:
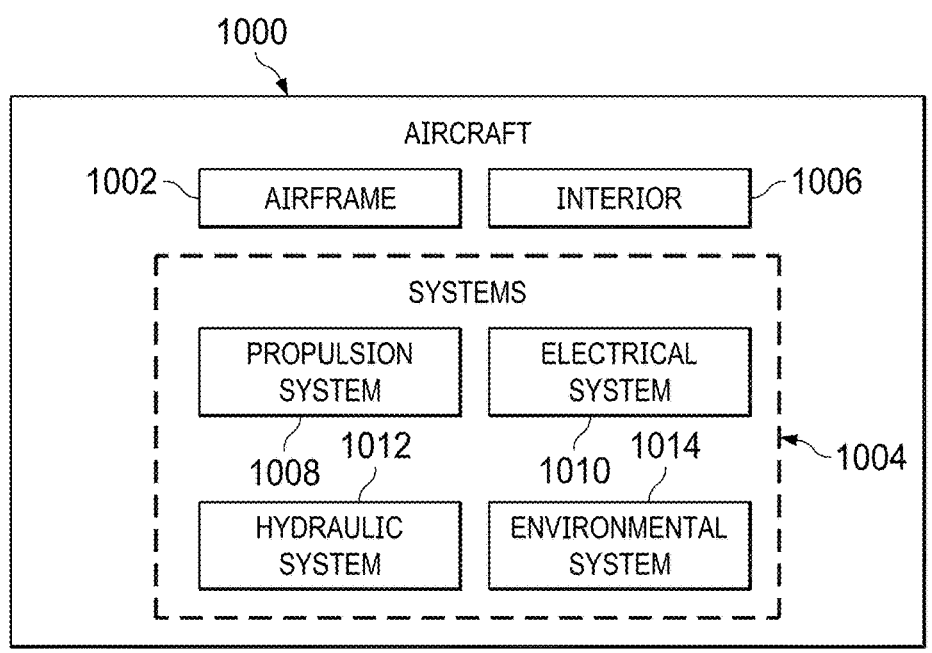
FIG. 10 is an illustration of an aircraft in the form of a block diagram in which an illustrative embodiment may be implemented.

Illustrative embodiments of the present disclosure may be described in the context of aircraft manufacturing and service method 900 as shown in FIG. 9 and aircraft 1000 as shown in FIG. 10. Turning first to FIG. 9, an illustration of an aircraft manufacturing and service method is depicted in accordance with an illustrative embodiment. During preproduction, aircraft manufacturing and service method 900 may include specification and design 902 of aircraft 1000 in FIG. 10 and material procurement 904.

During production, component and subassembly manufacturing 906 and system integration 908 of aircraft 1000 takes place. Thereafter, aircraft 1000 may go through certification and delivery 910 in order to be placed in service 912. While in service 912 by a customer, aircraft 1000 is scheduled for routine maintenance and service 914, which may include modification, reconfiguration, refurbishment, or other maintenance and service.

Each of the processes of aircraft manufacturing and service method 900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of an aircraft is depicted in which an illustrative embodiment may be implemented. In this example, aircraft 1000 is produced by aircraft manufacturing and service method 900 of FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 900. One or more illustrative embodiments may be used during at least one of component and subassembly manufacturing 906, system integration 908, or maintenance and service 914 of FIG. 9. For example, induction system 102 of FIG. 1 may be used during component and subassembly manufacturing 906 to form and cure thermoset composite charge 104. Thermoset composite charge 104 of FIG. 1 may be formed and cured during component and subassembly manufacturing 906 using method 800 of FIG. 8.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

Thermoset composite charge 104 of FIG. 1 may be a formed and cured into a component of aircraft 1000 joined during system integration 908. Induction system 102 of FIG. 1 may be used to form replacement components used during maintenance and service 914 of FIG. 9. For example, induction system 102 of FIG. 1 may be used to create composite structure from thermoset composite charge 104 to form a replacement component used during maintenance and service 914 of FIG. 9. Thermoset composite charge 104 of FIG. 1 may be formed and cured into a component for at least one of airframe 1002 or interior 1006.

The illustrative examples provide a first smart susceptor material and a second smart susceptor material to form and cure a thermoset composite charge in an induction system. Both forming and curing in a single induction system may reduce at least one of overall tooling costs, tooling footprint, manufacturing time, manufacturing utilities, or manufacturing waste. For example, forming and curing using induction heating may use less energy than curing in an autoclave. As another example, forming and curing using a single induction system may reduce material waste from bagging and rebagging a thermoset composite charge for separate forming and curing steps.

In some illustrative examples, the induction system combines the use of a flexible smart susceptor blanket style heater with an inductively heated laminated tool using smart susceptor shells. In these illustrative examples, the conformable smart susceptor blanket is heated to the optimal forming temperature and the lay-up is formed against the surface of the laminated tool using pneumatic pressure against a flexible membrane. In some illustrative examples, the conformable smart susceptor blanket is the flexible membrane. In other illustrative examples, a separate flexible membrane is provided for applying pneumatic pressure.

The laminated tooling is then rapidly heated to the curing temperature and the charge is cured. This process enables the forming of initial flat or simply shaped charges into more complicated cure parts in a seamlessly combined forming and curing step. This process uses the quick lay-up of simple shapes along with the efficient and rapid forming and curing using less labor for improved affordability.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An induction system configured to provide temperature and pressure control for forming and curing of a thermoset composite charge, the induction system comprising:
   a first tooling die and a second tooling die movable with respect to each other, wherein the first tooling die and the second tooling die form a die cavity, the first tooling die and the second tooling die comprising a plurality of stacked metal sheets, a plurality of air gaps defined between adjacent stacked metal sheets;
   a first smart susceptor material within the die cavity and connected to the first tooling die, wherein the first smart susceptor material has a first Curie temperature;
   a second smart susceptor material within the die cavity and associated with the second tooling die, wherein the second smart susceptor material has a second Curie temperature lower than the first Curie temperature;
   a flexible membrane between the second tooling die and the first smart susceptor material, wherein the flexible membrane is configured to receive pressure;
   a first pressure region within the die cavity formed by the first smart susceptor material and a vacuum film;
   a second pressure region within the die cavity formed by the vacuum film and the flexible membrane; and
   a third pressure region formed by the flexible membrane and a tooling surface connected to the second tooling die.

2. The induction system of claim 1 further comprising:
   a first set of conductors extending through the first tooling die and the second tooling die generating a first frequency range, wherein the first smart susceptor material is configured to be heated by the first frequency range; and
   a second set of conductors generating a second frequency range, wherein the second smart susceptor material is configured to be heated by the second frequency range.

3. The induction system of claim 1, wherein the second smart susceptor material is a component of a conformable smart susceptor blanket positioned within the die cavity.

4. The induction system of claim 1, wherein the second smart susceptor material is a smart susceptor plate beneath the flexible membrane.

5. The induction system of claim 1 further comprising:
   a cooling system configured to provide a cooling medium to a first set of stacked metal sheets such that the cooling medium passes through the air gaps between the first set of stacked metal sheets.

6. The induction system of claim 1, wherein the first smart susceptor material is part of a tooling surface with smart susceptor circuits embedded in the tooling surface, and wherein the tooling surface is connected to the first tooling die.

7. The induction system of claim 1, wherein the first smart susceptor material connected to the first tooling die is part of a first tooling surface connected to the first tooling die, and the induction system further comprises:
   a second tooling surface connected to the second tooling die, wherein the second tooling surface comprises the second smart susceptor material.

8. An induction system configured to provide temperature and pressure control for forming and curing of a thermoset composite charge, the induction system comprising:
   a first tooling die and a second tooling die movable with respect to each other, wherein the first tooling die and the second tooling die form a die cavity, the first tooling die and the second tooling die comprising a plurality of stacked metal sheets, a plurality of air gaps defined between adjacent stacked metal sheets;
   a first smart susceptor material within the die cavity and connected to the first tooling die, wherein the first smart susceptor material has a first Curie temperature;
   a second smart susceptor material within the die cavity and associated with the second tooling die, wherein the second smart susceptor material has a second Curie temperature lower than the first Curie temperature; and
   a flexible membrane between the second tooling die and the first smart susceptor material, wherein the flexible membrane is configured to receive pressure,
   wherein the second smart susceptor material is a component of a conformable smart susceptor blanket positioned within the die cavity,
   wherein the conformable smart susceptor blanket further comprises the flexible membrane.

9. An induction system configured to provide temperature and pressure control for forming and curing of a thermoset composite charge, the induction system comprising:
   an induction tool comprising:
      a first tooling die and a second tooling die movable with respect to each other, the first tooling die and the second tooling die comprising a plurality of stacked metal sheets, a plurality of air gaps defined between adjacent stacked metal sheets;
      a first set of conductors;
      a first smart susceptor surface connected to the first tooling die; and
      a second smart susceptor surface connected to the second tooling die;
   a conformable smart susceptor blanket positioned within a die cavity of the induction tool;
   a first pressure region formed by the first smart susceptor surface and a vacuum film;
   a second pressure region formed by the vacuum film and the conformable smart susceptor blanket; and
   a third pressure region formed by the conformable smart susceptor blanket and the second smart susceptor surface.

10. The induction system of claim 9, wherein the first smart susceptor surface is part of a tooling surface with smart susceptor circuits embedded in the tooling surface, and wherein the tooling surface is connected to the first tooling die.

11. The induction system of claim 9, further comprising:
    wherein the second smart susceptor surface is configured to heat a thermoset charge to a forming temperature, and wherein the first smart susceptor surface is configured to heat the thermoset charge to a curing temperature.

12. The induction system of claim 9, further comprising:
    a cooling system configured to cool portions of the first smart susceptor surface to below a first Curie temperature of the first smart susceptor surface.

13. An induction system configured to provide temperature and pressure control for forming and curing of a thermoset composite charge, the induction system comprising:
    an induction tool comprising:
       a first tooling die and a second tooling die movable with respect to each other, the first tooling die and the second tooling die comprising a plurality of stacked metal sheets, a plurality of air gaps defined between adjacent stacked metal sheets;
       a first set of conductors;
       a first smart susceptor surface connected to the first tooling die; and
       a second smart susceptor surface connected to the second tooling die; and
    a conformable smart susceptor blanket positioned within a die cavity of the induction tool,
    wherein a first smart susceptor material of the first smart susceptor surface and the second smart susceptor surface has a higher Curie temperature than a second smart susceptor material in the conformable smart susceptor blanket.

14. An induction system configured to provide temperature and pressure control for forming and curing of a thermoset composite charge, the induction system comprising:
    an induction tool comprising:
       a first tooling die and a second tooling die movable with respect to each other, the first tooling die and the second tooling die comprising a plurality of stacked metal sheets, a plurality of air gaps defined between adjacent stacked metal sheets;
       a first set of conductors;
       a first smart susceptor surface connected to the first tooling die; and
       a second smart susceptor surface connected to the second tooling die; and
    a conformable smart susceptor blanket positioned within a die cavity of the induction tool, wherein the conformable smart susceptor blanket comprises a second set of conductors configured to generate a second frequency range separate from a first frequency range of the first set of conductors.

15. An induction system configured to provide temperature and pressure control for forming and curing of a thermoset composite charge, the induction system comprising:
a first tooling die and a second tooling die movable with respect to each other, wherein the first tooling die and the second tooling die form a die cavity, the first tooling die and the second tooling die comprising a plurality of stacked metal sheets, a plurality of air gaps defined between adjacent stacked metal sheets;
a first smart susceptor surface formed of a first smart susceptor material within the die cavity and connected to the first tooling die;
a second smart susceptor surface formed of a second smart susceptor material within the die cavity and associated with the second tooling die; and
a flexible membrane between the second tooling die and the first smart susceptor material, wherein the flexible membrane is configured to receive pressure to move a thermoset charge within the die cavity and apply pressure to the thermoset charge to conform the thermoset charge to the first smart susceptor surface,
wherein the second smart susceptor material is a component of a conformable smart susceptor blanket positioned within the die cavity.

16. The induction system of claim 15 further comprising:
wherein the second smart susceptor surface is configured to heat a thermoset charge to a forming temperature, and wherein the first smart susceptor surface is configured to heat the thermoset charge to a curing temperature.

17. The induction system of claim 15, wherein the first smart susceptor material of the first smart susceptor surface has a higher Curie temperature than the second smart susceptor material.

18. The induction system of claim 15, wherein the first smart susceptor material is configured to be heated by a first frequency range, wherein the second smart susceptor material is configured to be heated by a second frequency range separate from the first frequency range.

19. The induction system of claim 15 further comprising:
a cooling system configured to cool portions of the first smart susceptor surface to below a first Curie temperature of the first smart susceptor surface.

20. The induction system of claim 15, wherein the conformable smart susceptor blanket further comprises the flexible membrane.

21. The induction system of claim 15, wherein the first smart susceptor material is part of a tooling surface with smart susceptor circuits embedded in the tooling surface, and wherein the tooling surface is connected to the first tooling die.

* * * * *